United States Patent
Anton

[11] 3,880,108
[45] Apr. 29, 1975

[54] TUMBLE DETECTOR

[75] Inventor: Miguel Molina Anton, Madrid, Spain

[73] Assignee: International Standard Electric Corporation, New York, N.Y.

[22] Filed: Oct. 4, 1973

[21] Appl. No.: 403,498

[30] Foreign Application Priority Data
Oct. 31, 1972  Spain ............................ 185177
Oct. 31, 1972  Spain ............................ 185178

[52] U.S. Cl. ............ 116/114 AH; 206/459; 273/113
[51] Int. Cl. ...................... G01d 21/00; B65d 79/2
[58] Field of Search ............... 116/114 AH, 114 R; 40/106.25; 206/459; 273/113

[56] References Cited
UNITED STATES PATENTS
| | | | |
|---|---|---|---|
| 849,236 | 4/1907 | Hayhurst | 273/113 |
| 1,215,069 | 2/1917 | Smith | 273/113 |
| 3,787,054 | 1/1974 | Stafford | 273/113 |

FOREIGN PATENTS OR APPLICATIONS
1,190,140   4/1970   United Kingdom .......... 116/114 AH

*Primary Examiner* — Richard C. Queisser
*Assistant Examiner* — Daniel M. Yasich
*Attorney, Agent, or Firm* — Thomas L. Peterson

[57] ABSTRACT

A tumble detector for accompanying goods to be transported to determine whether the goods have been transported in a recommended position. The detector comprises a container having a transparent face and a plurality of walls defining a labyrinth which contains different colored balls. The position of the balls in the labyrinth provides an indication of the amount and direction of turning of the goods.

11 Claims, 4 Drawing Figures

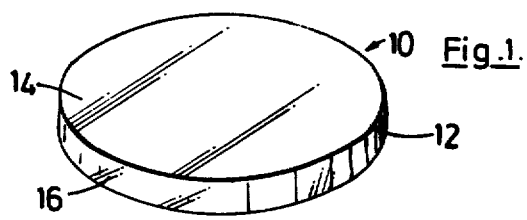
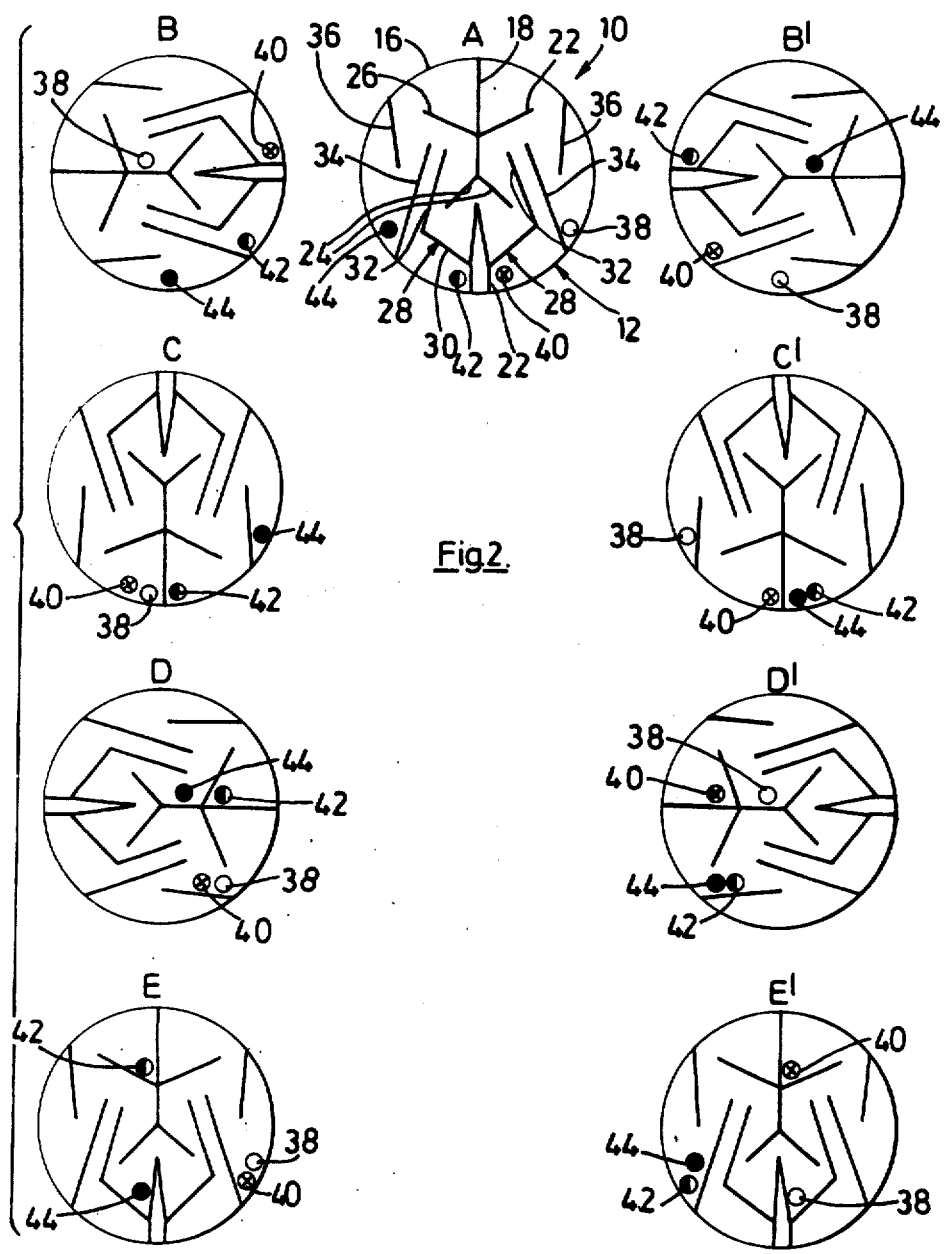
Fig. 1.
Fig. 2.

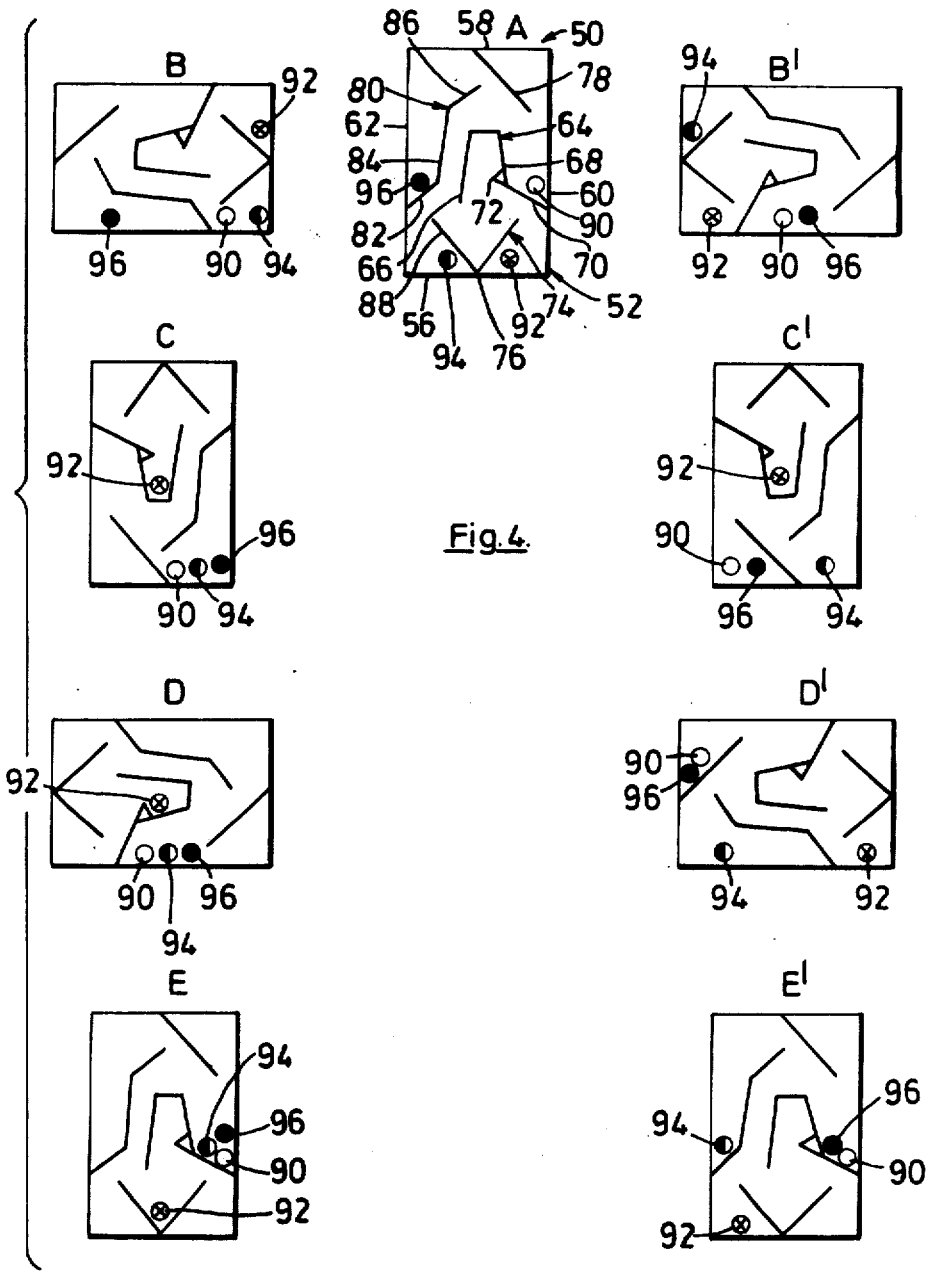

TUMBLE DETECTOR

BACKGROUND OF THE INVENTION

This invention relates generally to a tumble detector and, more particularly, to a detector for accompanying goods to be transported to determine whether the goods have been transported in a recommended position.

There are a great number of materials the nature of which requires that they be transported in a certain position. The usual means of fulfilling this requirement consists of certain instructions marked on the crates, such as arrows. These precautions prove to be insufficient since it is very common for materials to be received at their destination in a damaged condition and there always remains the suspicion that, at some time during transport, the recommended position has been changed. However, it is not possible to prove that this is so and, therefore, no grounds exists to claim damages from the carrier.

What is needed therefore is a device that indicates, on arrival of materials at their destination, whether they have been transported in the recommended position or not. The device should be capable of detecting not only the fact of improper transport, but also the number and direction of tumbles made in the region of 90°. The purpose of the present invention is to provide such a device.

SUMMARY OF THE INVENTION

According to the principal aspect of the present invention, there is provided a simple and inexpensive tumble detector for accompanying goods to be transported to determine whether the goods have been transported in a recommended position. The detector comprises a closed container having a transparent face for viewing the interior of the container. Partition means are formed in the container which define a labyrinth. A plurality of different colored balls are located in the labyrinth. The labyrinth is shaped so that the balls assume a predetermined different position in the container depending upon the amount and direction of turning of the container resulting from the handling undergone by the goods during transport.

BRIEF DESCRIPTION OF THE DRAWINGS

FIG. 1 is a perspective view of one form of the detector of the present invention;

FIG. 2A is a top plan view of the tumble detector in its correct position, while FIGS. 2B, C, D and E show the detector rotated through four counterclockwise quarter turns while FIGS. 2B', C', D' and E' show the detector rotated through four clockwise quarter turns;

FIG. 3 is a perspective view of a second form of the detector of the present invention; and FIG. 4A is a top plan view of the detector illustrated in FIG. 3 shown in its correct position while FIGS. 4B, C, D and E show the detector rotated through four counterclockwise quarter turns and FIGS. 4B', C', D' and E' show the detector rotated through four clockwise quarter turns.

DESCRIPTION OF THE PREFERRED EMBODIMENTS

Reference is now made to FIGS. 1 and 2 of the drawings in detail, which illustrate one form of the tumble detector of the invention, generally designated 10. The detector comprises a closed circular container 12 having a transparent face 14 and a circular perimeter 16. A partition arrangement is provided in the container 12 made up of a plurality of walls which are perpendicular to the face 14 of the container. This partition defines a symmetrical labyrinth. More specifically, the partition arrangement includes a wall 18 which extends radially from adjacent the center 20 of the container to the circular perimeter 16. A second wall 22 is aligned with the wall 18 and extends inwardly from the perimeter 16 toward the wall 18 but is spaced therefrom. As can be seen from FIG. 2, the walls 18 and 22 divide the container into two equal sides.

A third wall 24 is provided on each side of the container. The wall 24 is joined to the wall 18 adjacent to the center 20 of the container. A fourth wall 26 is also provided on each side of the container. This wall is joined to the wall 18 between the center 20 of the container and the perimeter 16. The walls 24 and 26 on each side of the container diverge outwardly from the wall 18 toward the perimeter 16.

A fifth wall 28 is also provided on each side of the container. Each fifth wall is joined to the wall 22 between the ends thereof and extends around the wall 24 toward the wall 26. More specifically, the fifth wall includes a first section 30 which is joined to the wall 22 and a second section 32 which is generally perpendicular to the wall 26.

A sixth wall 34 is also provided on each side of the container. This wall extends from the perimeter 16 outside of the wall 28 toward the wall 26. Preferably the wall 34 and the second section 32 of the wall 28 are parallel to each other.

A seventh wall 36 is formed on each side of the container and extends from the circular perimeter 16 adjacent to the end of the wall 26 toward the wall 34.

Four different colored balls 38, 40, 42 and 44 are provided in the container 12. A fewer number of balls could be utilized but such fewer number of balls would not indicate as many different turns as with four balls. While the balls have been described as being colored, they could, if desired, be of the same color if suitably marked so as to be distinguishable from one another. Except for the walls of the partition arrangement which are joined to each other or to the perimeter 16 of the container 12, the spacing between the walls is greater than the diameters of the balls.

To use the detector 10, the detector is placed inside the crate to be transported in the position illustrated in the FIG. 2A. FIGS. 2B, C, D and E show the tumble detector rotated 90°, 180°, 270°, and 360° in the counterclockwise direction. FIGS. 2B', C', D' and E' show the tumble detector rotated 90°, 180°, 270° and 360° in the clockwise direction. It is seen from each view in FIG. 2 that the balls in the detector 10 assume predetermined different positions for each quarter turn, which positions provide an indication of the amount and direction of turning of the crate resulting from handling undergone by the crate during transport. The position of the balls in the detector are checked upon arrival of the crate at its destination. If this position differs from that shown in FIG. 2A, a claim backed by sufficient evidence can be made against a carrier for damage to the goods.

From an inspection of the different positions illustrated in FIG. 1, it is easy to ascertain the position the balls would occupy, when the tumble detector, after being overturned several times in one direction, is overturned again one or more times in the opposite direction. FIG. 2 only shows the position of the tumble detector after four counterclockwise and clockwise turns, so as not to make the drawings exhaustive and considering that this number of turns is enough to detect the anomalies in normal transportation. Nevertheless, from an inspection of the FIGS., the positions of the tumble detector in successive turns can be ascertained.

Reference is now made to FIGS. 3 and 4 of the drawings, which illustrate a modified form of the detector of the invention, generally designated 50. This detector comprises a rectangular container 52 which has a transparent face 54. The rectangular container includes a pair of short parallel sides 56 and 58 and two longer parallel sides 60 and 62 which are perpendicular to the sides 56 and 58.

A partition arrangement is provided in the container 50 which defines an asymmetrical labyrinth, rather than a symmetrical labyrinth as in the embodiment illustrated in FIGS. 1 and 2. The partition arrangement in the detector 50 is made up of a plurality of walls which are perpendicular to the face 52 of the detector. More specifically, a first wall 64, of generally U-shaped configuration, is centrally positioned within the container 52. The U-shaped wall 64 faces one of the shorter sides 56 of the container. The U-shaped wall 64 includes a pair of legs 66 and 68 which diverge slightly outwardly from each other. A second wall 70 extends between the end of the leg 68 to the side 60 of the container. An inwardly extending projection 72 is formed on the leg 68 adjacent to the wall 70.

A generally V-shaped third wall 74 is joined at its apex 76 to the side 56 of the container. A fourth wall 78 is joined to the side 58 of the container and extends at an angle toward the side 60 thereof. A fifth wall 80 is joined to the side 62 of the container and extends at an angle toward the side 58. More specifically, the fifth wall 80 includes a first section 82, a second section 84, and a third section 86. The first section is joined to the side 62 and lies generally perpendicular to the leg 88 of the V-shaped wall 74. The second section 84 of the fifth wall extends generally parallel to the leg 66 of the U-shaped wall 64. The third section 86 of the fifth wall lies generally perpendicular to the wall 78.

As in the embodiment illustrated in FIGS. 1 and 2, four different colored balls 90, 92, 94 and 96 are positioned in the labyrinth defined by the walls in the container 52. Except where the walls are joined to each other or to the sides of the container, the walls are spaced apart a distance greater than the diameters of these balls.

In use, the detector is placed inside a crate in the position illustrated in FIG. 4A. FIGS. 4B, C, D and E show the detector rotated through quarter turns in the counterclockwise direction while FIGS. 4B', C', D' and E' show the detector rotated through quarter turns in the clockwise direction. The balls in the detector assume predetermined different positions therein indicating the amount and direction of turning of the goods. Thus, the detector 50 functions in the same manner as the detector 10.

What is claimed is:

1. A tumble detector for accompanying goods to be transported to determine whether said goods have been transported in a recommended position, comprising:

a generally flat closed container adapted to be vertically disposed in said goods, said container having a vertical front face thereof formed of a transparent material and a rear face parallel to said front face;

partition means in said container comprisng walls disposed perpendicular to said faces defining a labyrinth;

said labyrinth defining a plurality of pockets within said container, each pocket being interconnected directly or indirectly to each other pocket;

a plurality of different colored balls in said labyrinth, each said ball being disposed in a predetermined different one of said pockets when said container is initially mounted in said goods; and said labyrinth being shaped so that said balls assume a predetermined different position in said container to indicate the amount and direction of turning of said container in at least 90° turning increments resulting from the handling undergone by said goods during transport.

2. A tumble detector as set forth in claim 1 wherein:
said container has a circular perimeter; and
said partition means defines a symmetrical labyrinth.

3. A tumble detector as set forth in claim 2 wherein said partition means includes:

a first wall extending radially from adjacent the center of said container to said circular perimeter thereof;

a second wall aligned with said first wall extending inwardly from said circular perimeter toward said first wall but spaced therefrom;

said first and second walls dividing said container into two sides;

a third wall on each side of said container joined to said first wall adjacent to said center of said container;

a fourth wall on each side of said container joined to said first wall between said center and said circular perimeter;

said third and fourth walls on each side of said container diverging outwardly from said first wall toward said circular perimeter;

a fifth wall on each side of said container joined to said second wall between the ends thereof and extending around said third wall toward said fourth wall; and said walls being spaced from each other, except where joined, a distance greater than the diameters of said balls;

4. A tumble detector as set forth in claim 3 wherein said partition means further includes:

a sixth wall on each side of said container extending from said circular perimeter outside of said fifth wall and toward said fourth wall.

5. A tumble detector as set forth in claim 4 wherein said partition means further includes:

a seventh wall on each side of said container extending from said circular perimeter adjacent the end of said fourth wall toward said sixth wall.

6. A tumble detector as set forth in claim 5 wherein:

each said fifth wall includes a first section joined to said second wall and a second section generally perpendicular to said fourth wall;

said seventh walls are generally parallel to each other and to said first wall; and said sixth wall and said second section of said fifth wall on each side of said container are generally parallel to each other.

7. A tumble detector as set forth in claim 1 wherein:
said container has a rectangular perimeter; and
said partition means defines an asymmetrical labyrinth.

8. A tumble detector as set forth in claim 7 wherein said partition means includes:
- a first wall generally centrally positioned in said container, said first wall being generally U-shaped and facing one side of said container;
- a second wall extending between one leg of said U-shaped first wall and a second side of said container normal to said one side thereof;
- a generally V-shaped third wall joined at its apex to said one side and facing said U-shaped first wall;
- a fourth wall joined to the third side of said container opposite to said one side thereof and extending at an angle toward said second side;
- a fifth wall joined to the fourth side of said container and extending at an angle toward said third side thereof; and
- said walls being spaced from each other, except where joined, a distance greater than the diameters of said balls.

9. A tumble detector as set forth in claim 8 wherein said partition means further includes:
- an inwardly extending projection on said one leg of said U-shaped first wall adjacent to said second wall.

10. A tumble detector as set forth in claim 8 wherein:
- said fifth wall includes first, second and third sections;
- said first section being joined to said fourth side and lying generally perpendicular to the leg of said V-shaped third wall most closely adjacent thereto;
- said second section extending generally parallel to the other leg of said U-shaped first wall; and
- said third section lying generally perpendicular to said fourth wall.

11. A tumble detector as set forth in claim 10 wherein said partition means further includes:
- an inwardly extending projection on said one leg of said U-shaped first wall adjacent to said second wall.

* * * * *